(12) United States Patent
Johnson et al.

(10) Patent No.: US 10,605,227 B2
(45) Date of Patent: Mar. 31, 2020

(54) SEGMENTED WIND TURBINE ROTOR BLADE WITH WELDED JOINT

(71) Applicant: General Electric Company, Schenectady, NY (US)

(72) Inventors: Stephen Bertram Johnson, Greenville, SC (US); Xu Chen, Simpsonville, SC (US); Alan M. Walker, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 392 days.

(21) Appl. No.: 15/485,359

(22) Filed: Apr. 12, 2017

(65) Prior Publication Data

US 2018/0298879 A1    Oct. 18, 2018

(51) Int. Cl.
| | | |
|---|---|---|
| *F03D 1/06* | (2006.01) | |
| *B29C 65/00* | (2006.01) | |
| *B29L 31/08* | (2006.01) | |
| *B29C 65/48* | (2006.01) | |

(52) U.S. Cl.
CPC .......... *F03D 1/0675* (2013.01); *B29C 65/002* (2013.01); *B29C 66/1142* (2013.01); *B29C 66/54* (2013.01); *B29C 66/721* (2013.01); *B29C 66/72141* (2013.01); *B29C 65/48* (2013.01); *B29C 66/128* (2013.01); *B29C 66/1248* (2013.01); *B29C 66/12463* (2013.01); *B29C 66/7212* (2013.01); *B29C 66/73921* (2013.01); *B29C 66/73941* (2013.01); *B29L 2031/085* (2013.01); *F05B 2230/232* (2013.01); *F05B 2240/302* (2013.01); *F05B 2280/10* (2013.01); *Y02E 10/721* (2013.01); *Y02E 10/728* (2013.01); *Y02P 70/523* (2015.11)

(58) Field of Classification Search
CPC ............. F03D 1/0675; Y10T 29/49316; Y10T 29/49336; Y10T 29/49337
See application file for complete search history.

(56) References Cited

U.S. PATENT DOCUMENTS

| | | | |
|---|---|---|---|
| 5,556,565 A * | 9/1996 | Kirkwood | ............... B64C 1/065 |
| | | | 219/633 |
| 6,284,089 B1 * | 9/2001 | Anderson | ........... B29C 65/5042 |
| | | | 156/304.3 |
| 7,922,454 B1 | 4/2011 | Riddell | |
| 7,997,874 B2 | 8/2011 | van der Bos | |

(Continued)

FOREIGN PATENT DOCUMENTS

WO    WO2015/051803 A1    4/2015

*Primary Examiner* — Jason L Vaughan
*Assistant Examiner* — Amanda Kreiling
(74) *Attorney, Agent, or Firm* — Dority & Manning, P.A.

(57) ABSTRACT

The present disclosure is directed to a rotor blade assembly for a wind turbine having a first rotor blade segment with a first spar cap segment and a second rotor blade segment with a second spar cap segment. The first and second spar cap segments are arranged together at an interface and are constructed of a composite material. Further, the rotor blade assembly includes a joint assembly at the interface of the first and second spar cap segments. The joint assembly is constructed of a first metal joint secured to the first spar cap segment and a second metal joint secured to second spar cap segment. Moreover, the first and second metal joints are welded together at a weld area.

12 Claims, 9 Drawing Sheets

(56) References Cited

U.S. PATENT DOCUMENTS

| | | |
|---|---|---|
| 8,123,488 B2 | 2/2012 | Finnigan et al. |
| 8,172,539 B2 | 5/2012 | Kootstra |
| 8,177,514 B2 | 5/2012 | Hibbard |
| 8,177,515 B2 | 5/2012 | Hibbard |
| 8,562,296 B2 | 10/2013 | Arocena De La Rua et al. |
| 9,388,789 B2 | 7/2016 | Hibbard et al. |
| 2008/0292849 A1* | 11/2008 | Stephan .................... B32B 3/02 428/192 |
| 2011/0215799 A1 | 9/2011 | Godbole et al. |
| 2011/0221202 A1 | 9/2011 | Bernhoff |
| 2012/0134838 A1* | 5/2012 | Ramirez Jimenez ... B29C 61/00 416/229 R |
| 2012/0141287 A1 | 6/2012 | Hynum et al. |
| 2015/0240780 A1 | 8/2015 | Leonard et al. |
| 2016/0160650 A1 | 6/2016 | Kullander |
| 2016/0169195 A1 | 6/2016 | Johnson et al. |
| 2016/0341177 A1* | 11/2016 | Bech ....................... F03D 1/065 |

* cited by examiner

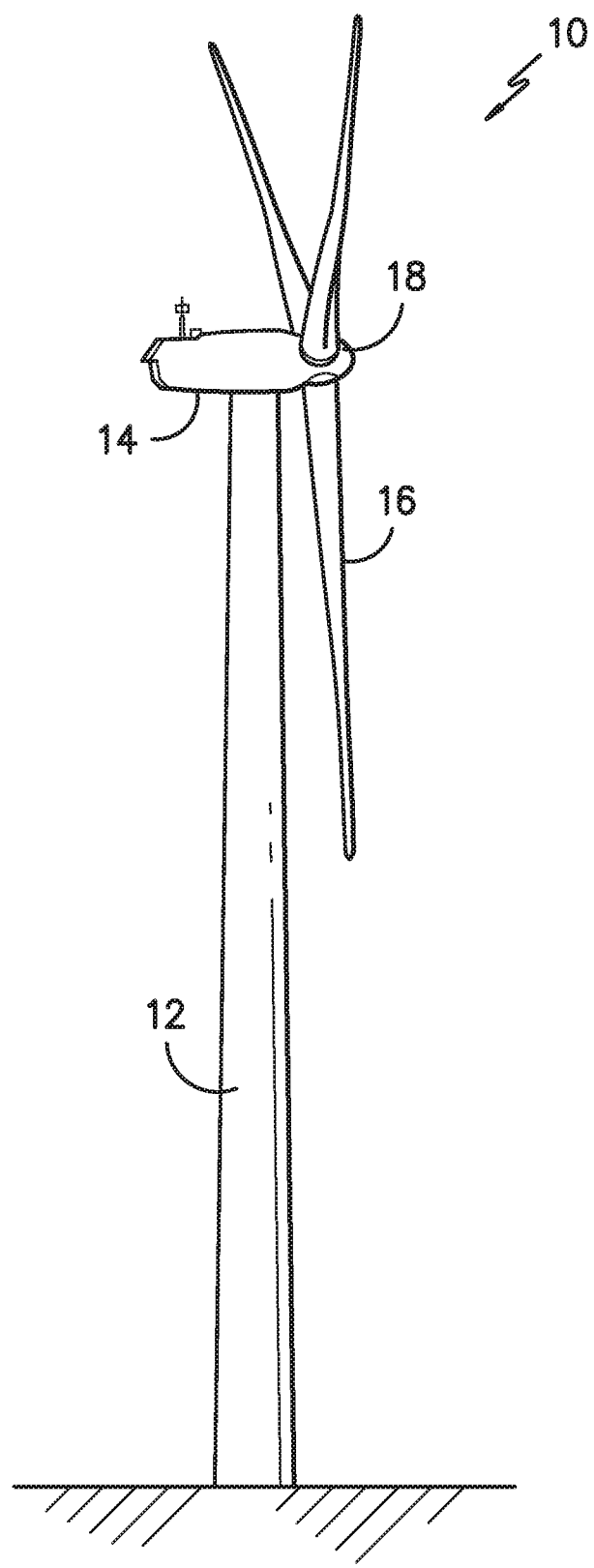
FIG. -1-

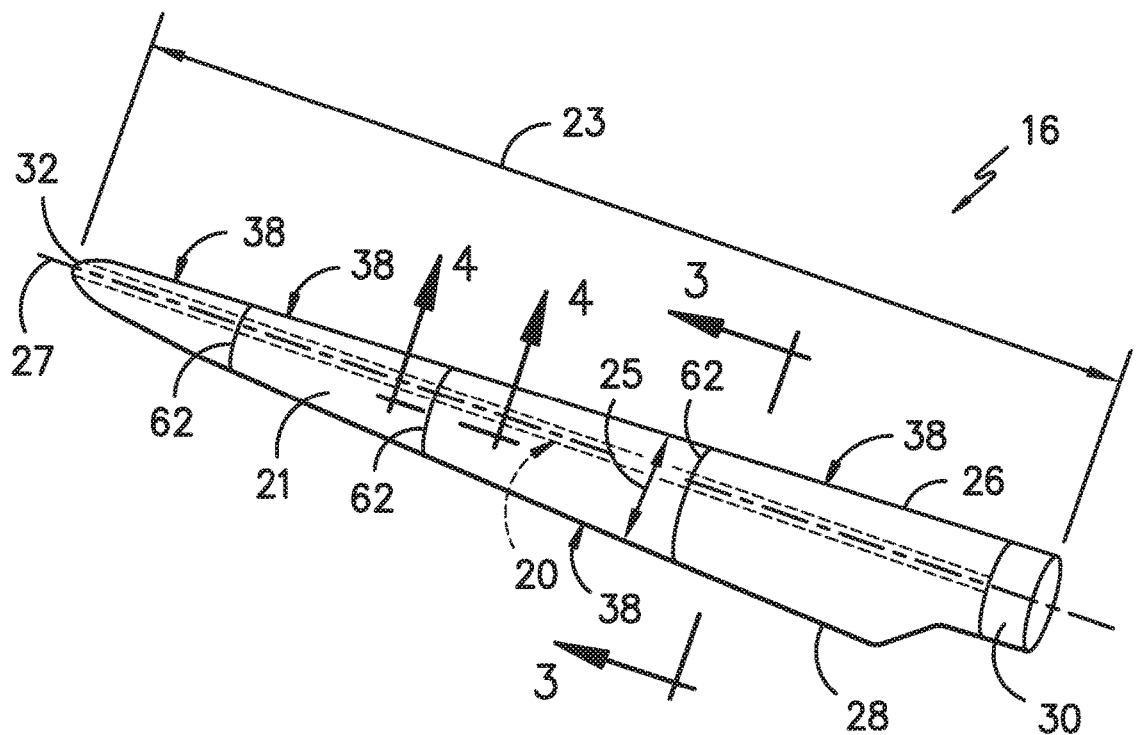
FIG. -2-
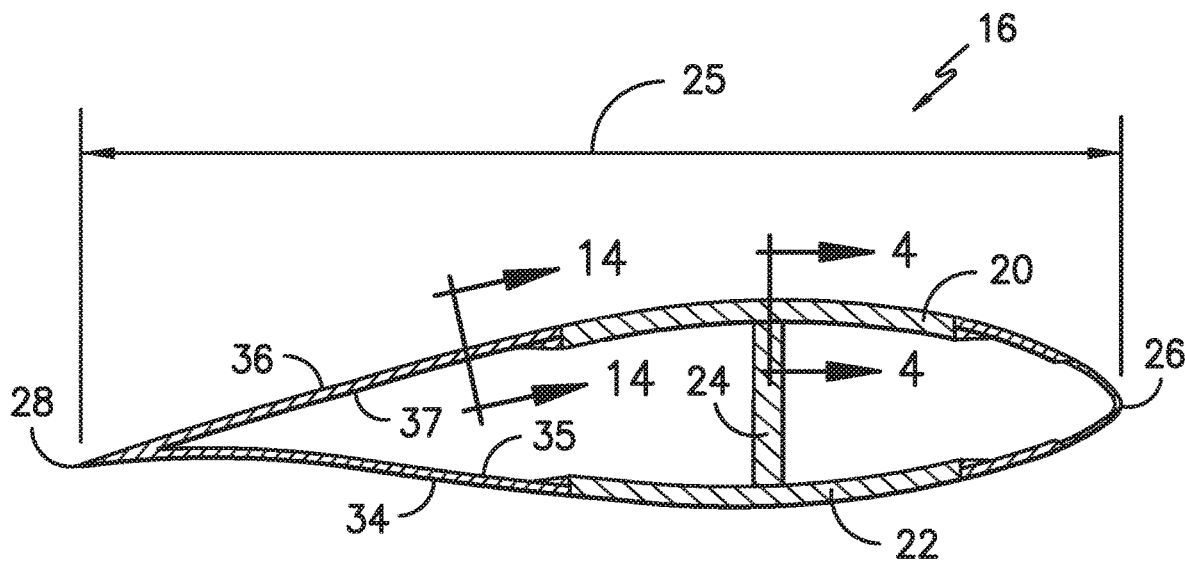
FIG. -3-

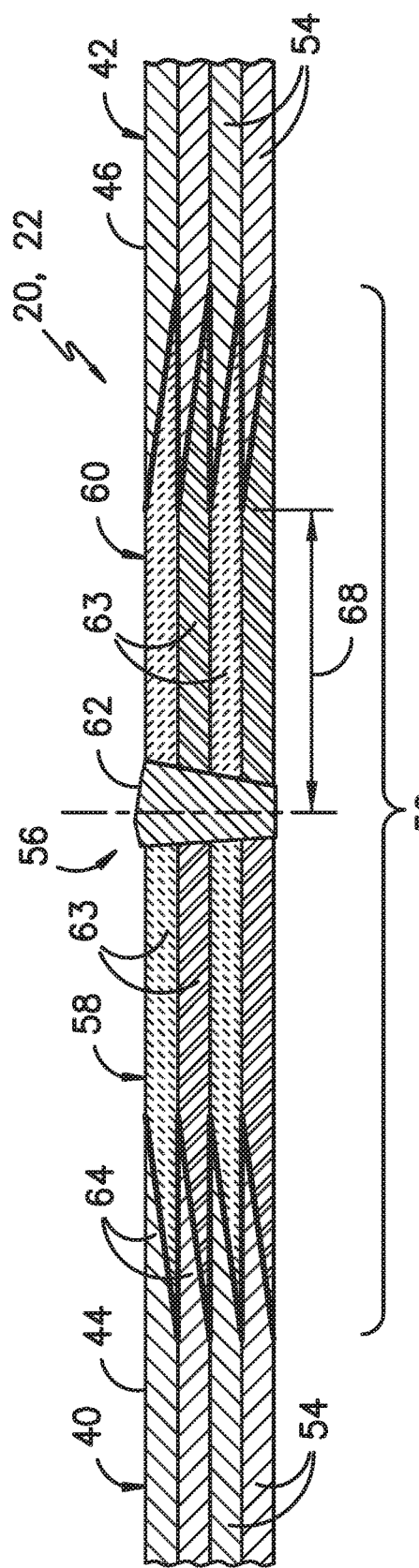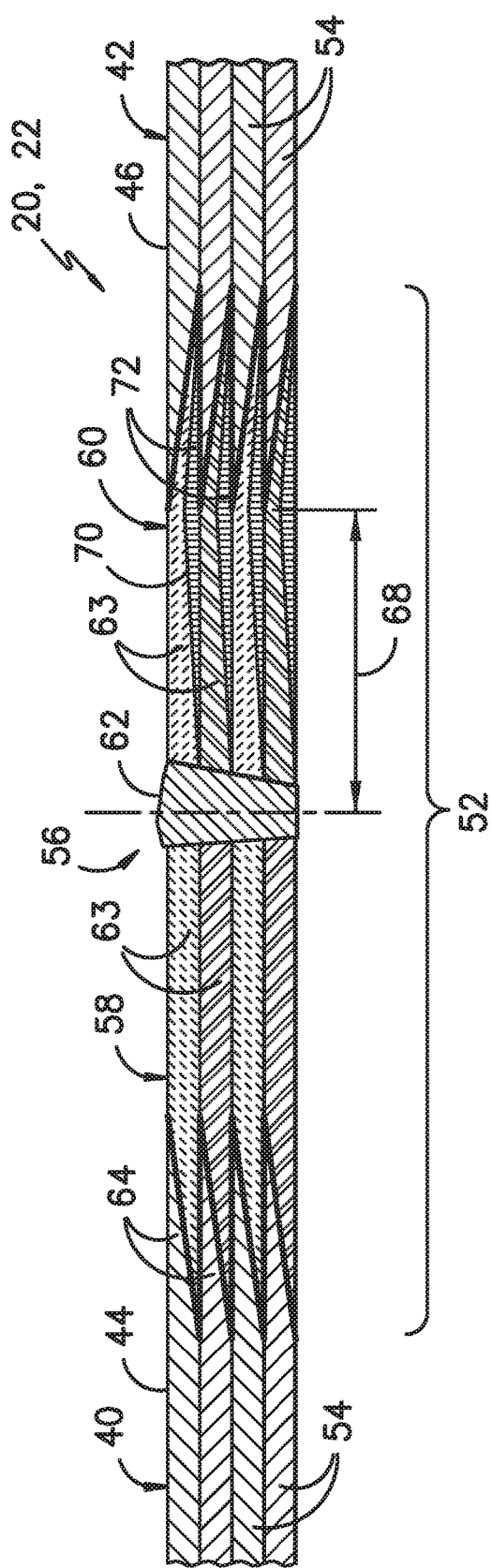

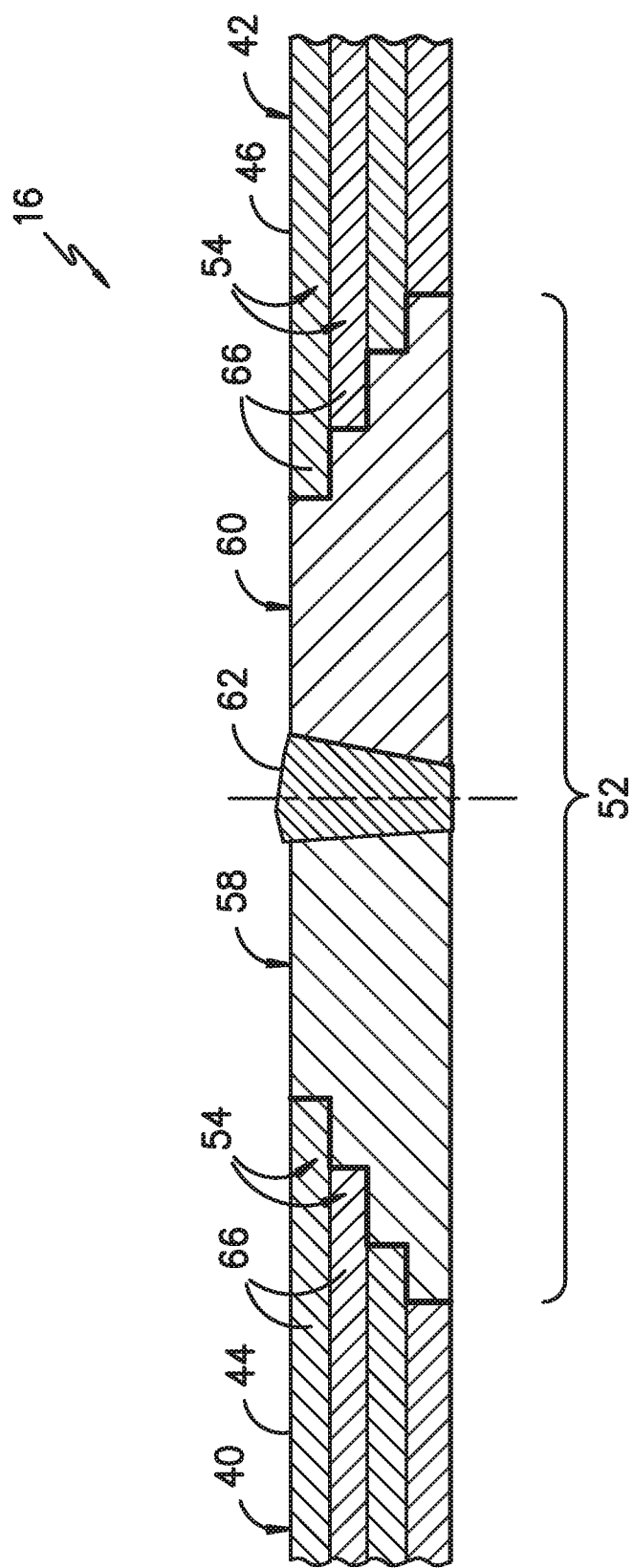
FIG. -6-

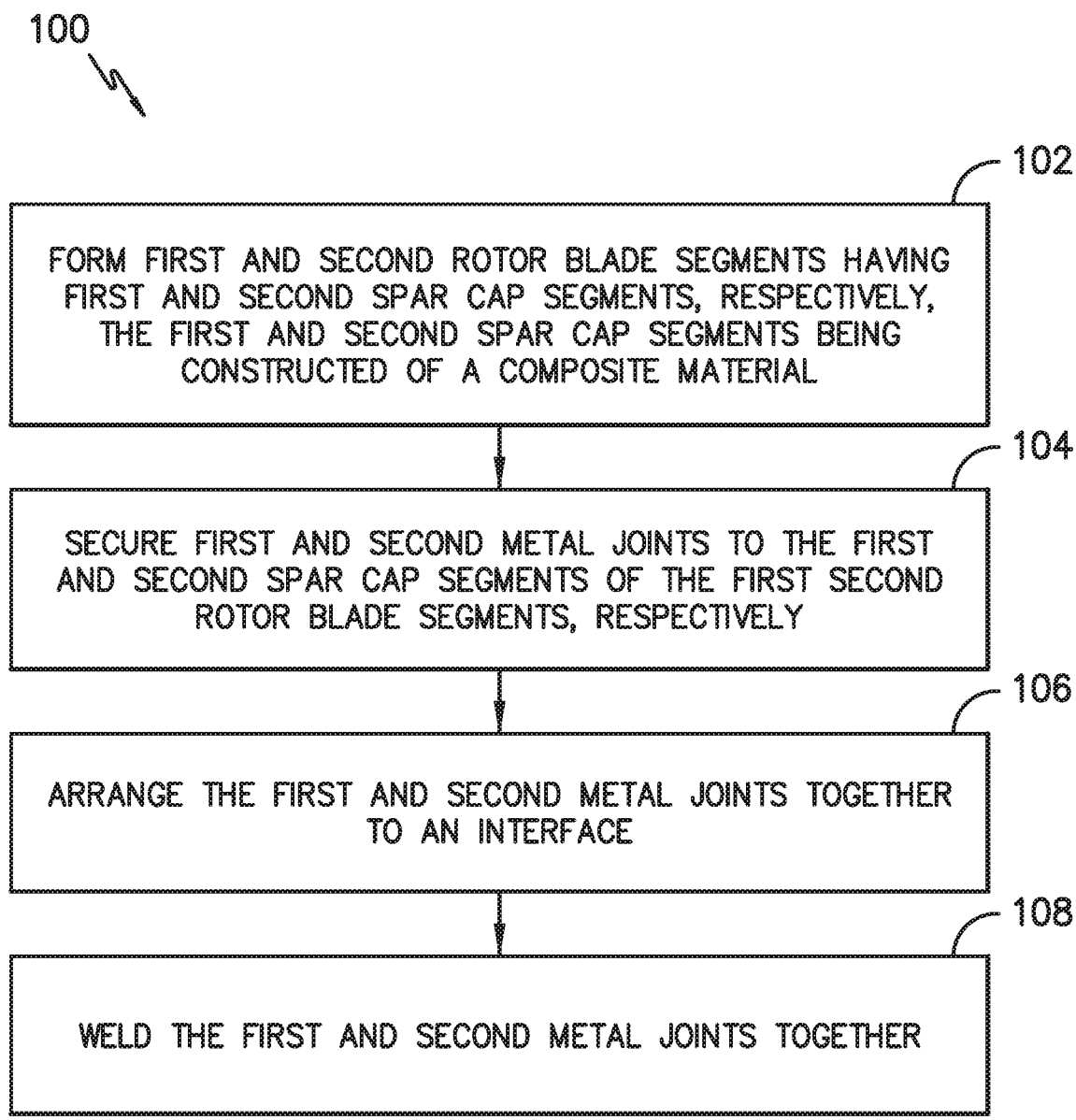
FIG. -7-

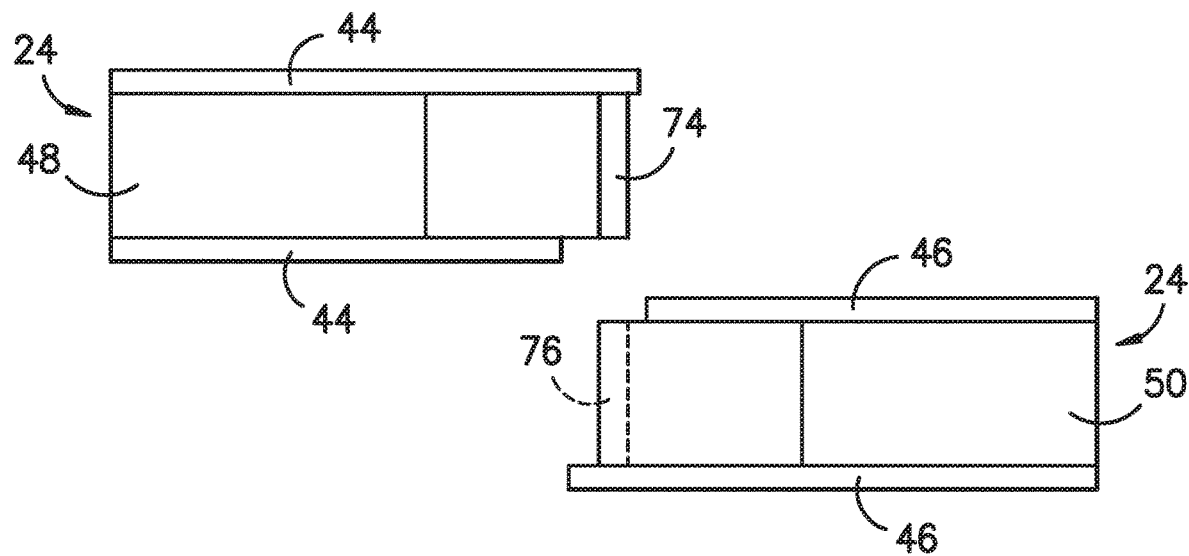
FIG. -8-
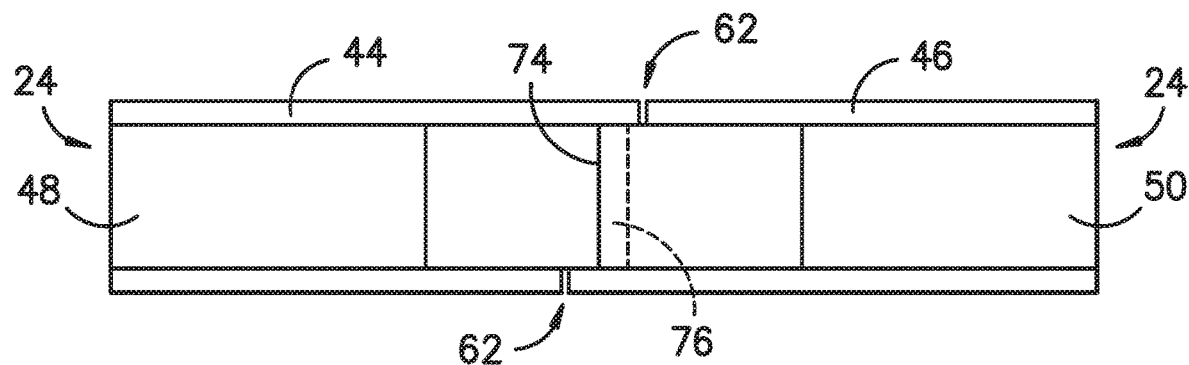
FIG. -9-

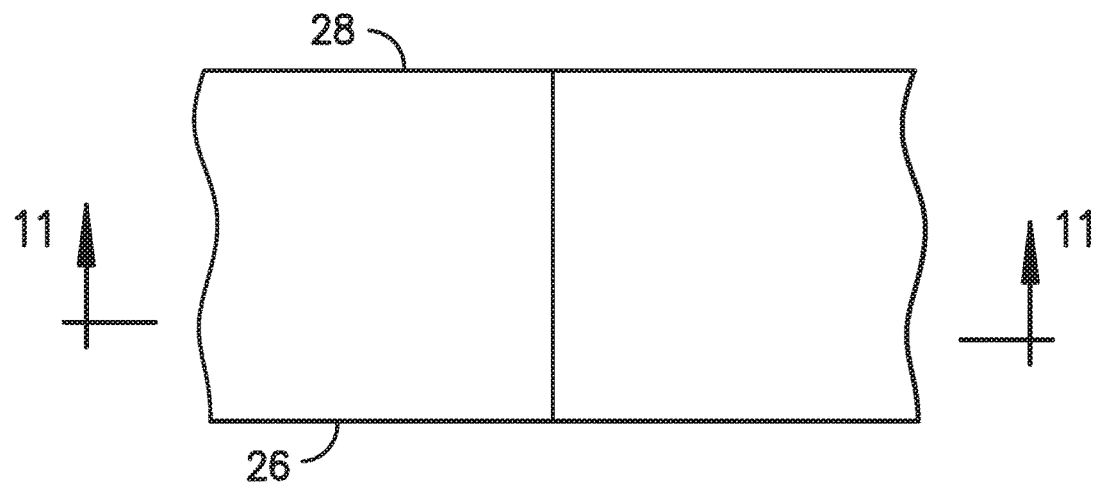
FIG. -10-
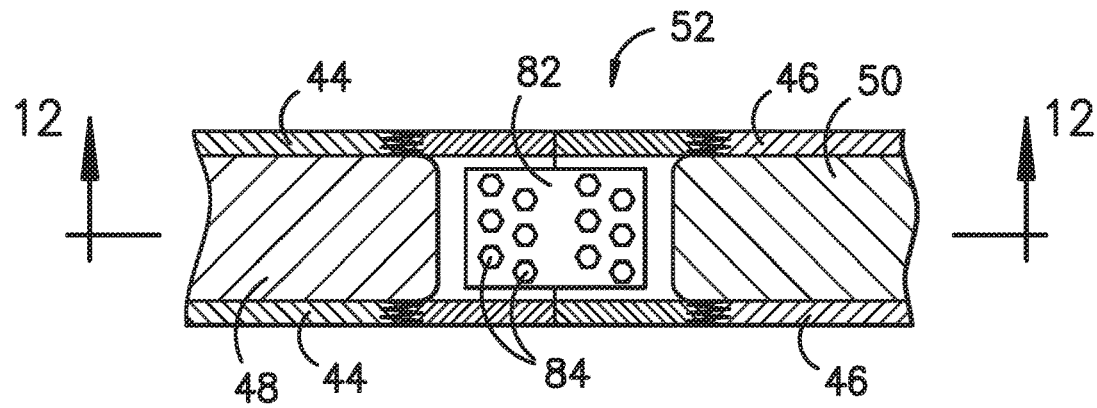
FIG. -11-
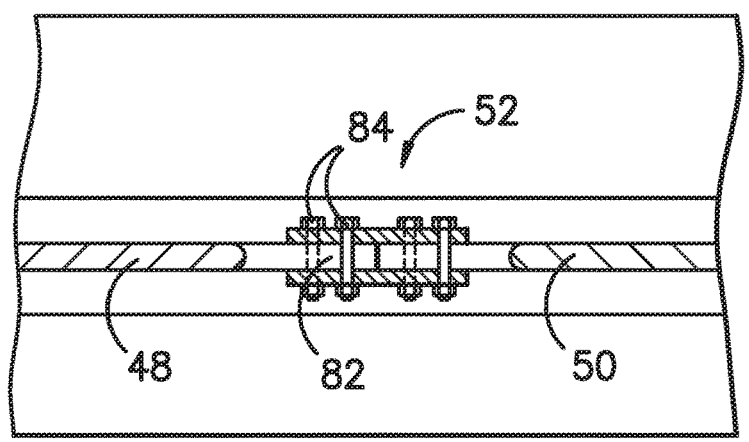
FIG. -12-

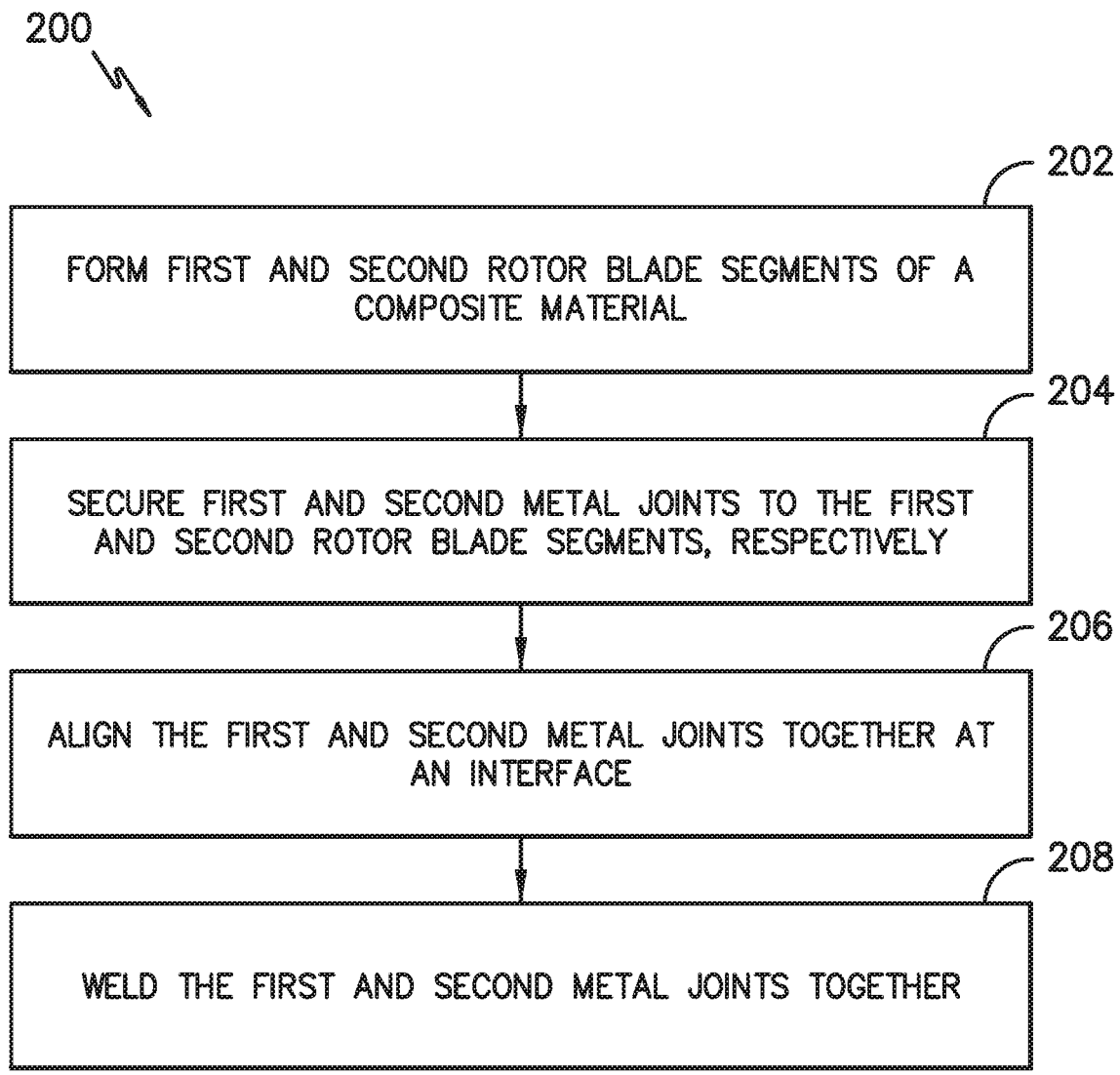
FIG. -13-

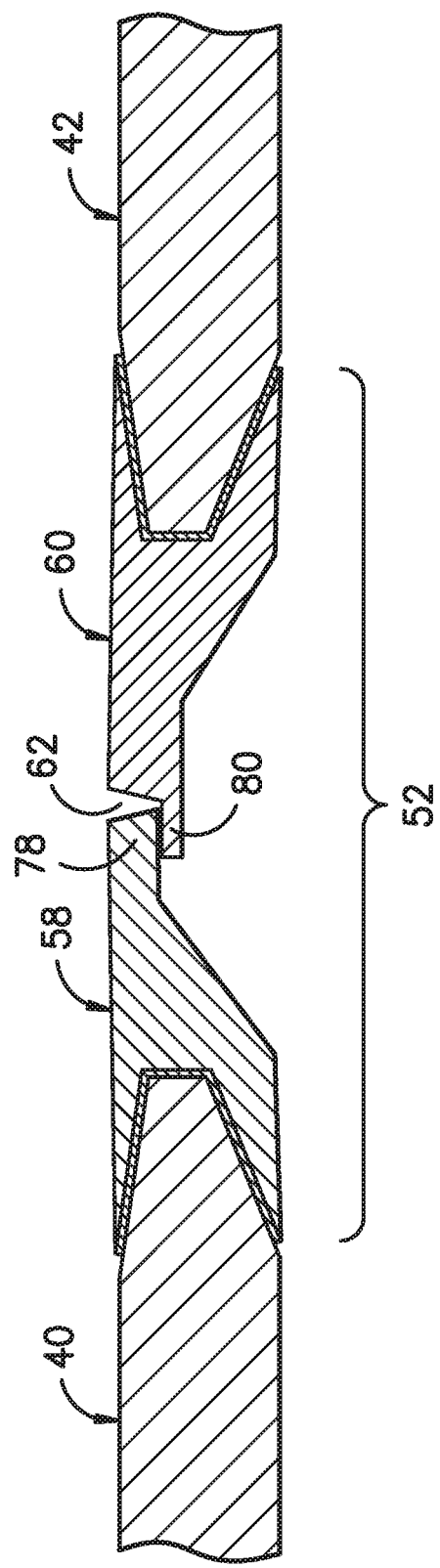
FIG. -14-

SEGMENTED WIND TURBINE ROTOR BLADE WITH WELDED JOINT

FIELD OF THE INVENTION

The present disclosure relates in general to wind turbine rotor blades, and more particularly to segmented rotor blades having welded joints and methods of joining same.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy from the wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The size, shape, and weight of rotor blades are common factors that contribute to energy efficiencies of wind turbines. An increase in rotor blade size increases the energy production of a wind turbine, while a decrease in weight also furthers the efficiency of the wind turbine. Furthermore, as rotor blade sizes grow, extra attention needs to be given to the structural integrity thereof. Accordingly, efforts to increase rotor blade size and strength aid in the continuing growth of wind turbine technology and the adoption of wind energy as an alternative energy source.

As the size of wind turbines increases, particularly the size of the rotor blades, so do the respective costs of manufacturing, transporting, and assembly of the wind turbines. The economic benefits of increased wind turbine sizes must be weighed against these factors. For example, the costs of pre-forming, transporting, and erecting a wind turbine having large rotor blades may significantly impact the economic advantage of a larger wind turbine.

One known strategy for reducing the costs of pre-forming, transporting, and erecting wind turbines having rotor blades of increasing sizes is to manufacture the rotor blades in blade segments. The blade segments may be assembled to form the rotor blade after, for example, the individual blade segments are transported to an erection location. However, known methods for connecting the blade segments together, such as bonded and bolted joints, have a variety of disadvantages. For example, bonded joints can offer optimum strength and weight for the connecting segments; however, such joints can be complex and difficult to accomplish in the field. In addition, bonded joints may require expensive environmental conditions to be maintained. Though bolted joints can typically be easier to assemble in the field, they are not as efficient at transferring loads from the tip section to the root section of the rotor blade, require materials and weight to be added to the rotor blade, and require long term monitoring and maintenance.

Accordingly, the art is continuously seeking new and improved joint technologies for joining blade segments of rotor blades. More specifically, there is a need for a joint assembly for rotor blade segments that simplifies the assembly thereof.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a rotor blade assembly for a wind turbine. The rotor blade assembly includes a first rotor blade segment having a first spar cap segment and a second rotor blade segment having a second spar cap segment. The first and second spar cap segments are arranged together at an interface and are constructed of a composite material. Further, the rotor blade assembly includes a joint assembly at the interface of the first and second spar cap segments. The joint assembly is constructed of a first metal joint secured to the first spar cap segment and a second metal joint secured to second spar cap segment. Moreover, the first and second metal joints are welded together at a weld area.

In one embodiment, the composite material of the first and second spar cap segments may include one or more pultrusions. In another embodiment, the pultrusion(s) of the first and second spar cap segments may have beveled or stepped ends at the interface.

In further embodiments, the first and second metal joints may each include a plurality of metal plates. In such embodiments, the plurality of metal plates of each of the first and second spar cap segments may be bonded to the pultrusion(s) of the first and second spar cap segments, respectively, via at least one of a resin material, an adhesive, or other suitable means. Another embodiment may use a single metal element configured with fingers that is manufactured via additive or subtractive methods.

In additional embodiments, the weld area may be positioned a predetermined distance from the composite material of the first and second spar cap segments such that heat from welding does not negatively impact the composite material.

In several embodiments, a side of each of the plurality of metal plates may have a sloped area. In such embodiments, a filler material may be placed within each of the sloped areas of the plurality of metal plates.

In particular embodiments, the first and second metal joints may include steel, such as stainless steel, titanium, or any other metal joint having the desired strength and/or weldability. In certain embodiments, the composite material may include a thermoplastic material or a thermoset material.

In another aspect, the present disclosure is directed to a method for joining rotor blade segments of a rotor blade of a wind turbine. The method includes forming first and second rotor blade segments having first and second spar cap segments, respectively. Further, the first and second spar cap segments are constructed of a composite material. The method also includes securing first and second metal joints to the first and second spar cap segments of the first and second rotor blade segments, respectively. In addition, the method includes arranging the first and second metal joints together at an interface and welding the first and second metal joints together.

In one embodiment, as mentioned, the composite material of the first and second spar cap segments may include pultrusions. In such embodiments, the method may include forming at least one of beveled ends or stepped ends into the one or more pultrusions of the first and second spar cap segments at the interface. In another embodiment, the method may include staggering ends of the one or more pultrusions of the first and second spar cap segments at the interface.

In further embodiments, the method may include forming the first and second rotor blade segments with first and second shear web segments, respectively. In such embodiments, the first and second shear web segments may include first and second interlocking ends, respectively. As such, the method may also include arranging the first and second interlocking ends together and welding the first and second interlocking ends concurrently with the first and second metal joints of the first and second spar cap segments.

In additional embodiments, wherein the first and second metal joints each include metal plates, the step of securing the first and second metal joints to the first and second spar cap segments, respectively, may include bonding the plurality of metal plates of each of the first and second metal joints to the one or more pultrusions of the first and second spar cap segments, respectively, via an adhesive. Alternatively, the step of securing the first and second metal joints to the first and second spar cap segments, respectively, may include infusing the plurality of metal plates of each of the first and second metal joints to the one or more pultrusions of the first and second spar cap segments, respectively, via a resin material.

In several embodiments, the method may further include providing additional features at the interface to secure the first and second rotor blade segments together in addition to welding. For example, in certain embodiments, the additional features may include placing additional pultrusions or metal components between the first and second metal joints, placing a metallic mesh between the first and second metal joints, and/or utilizing a joint plate and a plurality of bolts at the interface.

In certain embodiments, the method may also include forming a sloped area into a side of each of the plurality of metal plates and placing a filler material within each of the sloped areas of the plurality of metal plates.

In another aspect, the present disclosure is directed to a method for joining rotor blade segments of a rotor blade of a wind turbine. The method includes forming first and second rotor blade segments of a composite material. The method also includes securing first and second metal joints to the first and second rotor blade segments, respectively. Further, the method includes aligning the first and second metal joints together at an interface and welding the first and second metal joints together.

In one embodiment, the step of securing the first and second metal joints to the first and second rotor blade segments, respectively, may include bonding the first and second metal joints to the first and second rotor blade segments via at least one of an adhesive or a resin material.

In another embodiment, the step of aligning the first and second metal joints together at the interface may include aligning corresponding interlocking components of the first and second metal joints together before welding.

In particular embodiments, the interface may be located away from structural components of the rotor blade, e.g. the spar caps or the shear web thereof.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective view of a segmented wind turbine rotor blade according to the present disclosure;

FIG. 3 illustrates a cross-sectional view of the rotor blade of FIG. 2 along 3-3;

FIG. 4 illustrates a cross-sectional view of one embodiment of the rotor blade of FIG. 2 along 4-4;

FIG. 5 illustrates a cross-sectional view of another embodiment of the rotor blade of FIG. 2 along 4-4;

FIG. 6 illustrates a cross-sectional view of yet another embodiment of the rotor blade of FIG. 2 along 4-4;

FIG. 7 illustrates a flow diagram of one embodiment of a method for joining rotor blade segments of a rotor blade of a wind turbine according to the present disclosure;

FIG. 8 illustrates a side view of one embodiment of shear web segments having interlocking components according to the present disclosure;

FIG. 9 illustrates a side view of the shear web segments of FIG. 8, with the interlocking components being joined together according to the present disclosure;

FIG. 10 illustrates a top view of the rotor blade of the wind turbine at the interface according to the present disclosure;

FIG. 11 illustrates a cross-sectional view of FIG. 10 along line 11-11;

FIG. 12 illustrates a cross-sectional view of FIG. 11 along line 12-12;

FIG. 13 illustrates a flow diagram of another embodiment of a method for joining rotor blade segments of a rotor blade of a wind turbine according to the present disclosure; and FIG. 14 illustrates a cross-sectional view of the rotor blade of FIG. 3 along line 14-14.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring to the drawings, FIG. 1 illustrates perspective view of one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is, in turn, connected to a main flange that turns a main rotor shaft. The wind turbine power generation and control components are housed within the nacelle 14. It should be appreciated that the wind turbine 10 of FIG. 1 is provided for illustrative purposes only to place the present invention in an exemplary field of use. Thus, one of ordinary skill in the art should understand that the invention is not limited to any particular type of wind turbine configuration.

Referring now to FIGS. 2 and 3, one of the rotor blades 16 of FIG. 1 is illustrated according to the present disclosure. In particular, FIG. 2 illustrates a perspective view of the rotor blade 16, whereas FIG. 3 illustrates a cross-sectional view of the rotor blade 16 along the sectional line 3-3 shown in FIG. 2. As shown, the rotor blade 16 generally includes a blade root 30 configured to be mounted or otherwise secured to the hub 18 (FIG. 1) of the wind turbine 10 and a blade tip 32 disposed opposite the blade root 30. A body shell 21 of the rotor blade generally extends between the blade root 30 and the blade tip 32 along a longitudinal axis 27. The body shell 21 may generally serve as the outer casing/covering of the rotor blade 16 and may define a substantially aerodynamic profile, such as by defining a symmetrical or cambered airfoil-shaped cross-section. The body shell 21 may also define a pressure side 34 and a suction side 36 extending between leading and trailing edges 26, 28 of the rotor blade 16. Further, the rotor blade 16 may also have a span 23 (FIG. 2) defining the total length between the blade root 30 and the blade tip 32 and a chord 25 (FIG. 3) defining the total length between the leading edge 26 and the trialing edge 28. As is generally understood, the chord 25 may generally vary in length with respect to the span 23 as the rotor blade 16 extends from the blade root 30 to the blade tip 32.

In several embodiments, the body shell 21 may be formed from a plurality of rotor blade segments 38. For example, as shown in FIG. 2, the body shell 21 may be formed from a plurality of blade segments 38 aligned in a span-wise end-to-end configuration. More specifically, as shown in FIGS. 4 and 5, the rotor blade segments 38 may include, at least, a first rotor blade segment 40 and a second rotor blade segment 42. It should be understood, however, that the rotor blade 16 may be formed from any suitable number of blade segments 38.

Additionally, the rotor blade segments 38 may generally be formed from any suitable material. For instance, in one embodiment, the body shell 21 may be formed entirely from a laminate composite material, such as a carbon fiber reinforced laminate composite or a glass fiber reinforced laminate composite. Alternatively, one or more portions of the body shell 21 may be configured as a layered construction and may include a core material, formed from a lightweight material such as wood (e.g., balsa), foam (e.g., extruded polystyrene foam) or a combination of such materials, disposed between layers of laminate composite material. In additional embodiments, the body shell 21 may be formed of any suitable composite material, including thermoplastic and/or thermoset materials.

Referring particularly to FIG. 3, the rotor blade 16 may also include one or more longitudinally extending structural components configured to provide increased stiffness, buckling resistance and/or strength to the rotor blade 16. For example, the rotor blade 16 may include a pair of longitudinally extending spar caps 20, 22 configured to be engaged against the opposing inner surfaces 35, 37 of the pressure and suction sides 34, 36 of the rotor blade 16, respectively. Additionally, one or more shear webs 24 may be disposed between the spar caps 20, 22 so as to form a beam-like configuration. The spar caps 20, 22 may generally be designed to control the bending stresses and/or other loads acting on the rotor blade 16 in a generally span-wise direction (a direction parallel to the span 23 of the rotor blade 16) during operation of a wind turbine 10. Similarly, the spar caps 20, 22 may also be designed to withstand the span-wise compression occurring during operation of the wind turbine 10.

More specifically, as shown in FIGS. 3-5, each individual blade segment 38 may further include a spar cap segment 44, 46. For example, as shown particularly in FIGS. 4 and 4, the first rotor blade segment 40 includes a first spar cap segment 44 and the second rotor blade segment 42 includes a second spar cap 46. The spar cap segments 44, 46 may extend at least partially through the blade segments 38 in the span-wise direction (defined as in the direction of the span 23 of the rotor blade 16) and may have a width in the chord-wise direction (defined as in the direction of the chord 25 of the rotor blade). Similarly, the shear web 24 may be formed of a plurality of shear web segments 48, 50, as shown in FIGS. 8 and 9, which is discussed in more detail below.

The spar cap segments 44, 46 and the shear web segments 48, 50 may be formed from any suitable material, including but not limited to laminate composite materials, such as a carbon fiber reinforced laminate composite or a glass fiber reinforced laminate composite. In addition, the spar cap segments 44, 46 may be formed via one or more pultrusions or pultruded members 54. As used herein, the terms "pultrusions," "pultruded members" or similar generally encompass reinforced materials (e.g. fibers or woven or braided strands) that are impregnated with a resin and pulled through a heated stationary die such that the resin cures or undergoes polymerization. As such, the process of manufacturing pultruded composites is typically characterized by a continuous process of composite materials that produces composite parts having a constant cross-section.

Referring particularly to FIGS. 4 and 5, various cross-sectional views of an interface 52 between the first and second spar cap segments 44, 46 are illustrated. More specifically, as shown, the rotor blade 16 includes a joint assembly 56 at the interface 52 of the first and second spar cap segments 44, 46. In addition, as shown, the pultrusion(s) 54 of the first and second spar cap segments 44, 46 may have beveled ends 64 at the interface 52. Alternatively, as shown in FIG. 6, the pultrusion(s) 54 of the first and second spar cap segments 44, 46 may have stepped ends 66 at the interface 52.

Referring still to FIGS. 4 and 5, the joint assembly 56 is constructed of a first metal joint 58 secured to the first spar cap segment 44 and a second metal joint 60 secured to second spar cap segment 46. In particular embodiments, the first and second metal joints 58, 60 may include steel, such as stainless steel, titanium, or any other metal joint having the desired strength and/or weldability for the joint assembly 56. More specifically, as illustrated, the first and second metal joints 58, 60 may each include a plurality of metal plates. In such embodiments, the plurality of metal plates of each of the first and second spar cap segments 44, 46 may be bonded to the pultrusion(s) 54 of the first and second spar cap segments 44, 46, respectively, via at least one of a resin material or an adhesive. For example, in one embodiment, the metal plates may be bonded to the pultrusion(s) 54 during the shell infusion process using any suitable resin material. Alternatively, the metal plates may be bonded to the pultrusion(s) 54 using an adhesive film or a paste adhesive.

In additional embodiments, as shown particularly in FIG. 5, one or more sides of the metal plates 63 may have a sloped area 70. In such embodiments, the sloped areas 70, rather than flat sides, is configured to allow the strain in the metal joint to match the strain in the composite material of the first and second spar cap segments 44, 46. In additional embodiments, a filler material 72 may be placed within each of the sloped areas 70 of the plurality of metal plates 63. For example, in particular embodiments, the filler material 72 may include neat resin, balsa, or thermoplastic materials. Further, the filler material 72 may have a low modulus of elasticity such that the strain passes through the composite material of the first and second spar cap segments 44, 46 to the first and second metal joints, respectively.

In addition, as shown, the first and second metal joints 58, 60 are welded together at a weld area 62. Further, as shown in FIGS. 4 and 5, the weld area 62 may be positioned a predetermined distance 68 from the composite material of the first and second spar cap segments 44, 46 such that heat from the welding process does not negatively impact the composites 54.

Referring now to FIG. 7, a flow diagram of one embodiment of a method 100 for joining rotor blade segments 38 of a rotor blade 16 of a wind turbine 10 is illustrated. As shown at 102, the method 100 includes forming first and second rotor blade segments 40, 42 having first and second spar cap segments 44, 46, respectively. Further, as mentioned, the first and second spar cap segments 44, 46 are constructed of a composite material. As shown at 104, the method 100 includes securing first and second metal joints 58, 60 to the first and second spar cap segments 44, 46 of the first and second rotor blade segments 40, 42, respectively. In one embodiment, where the first and second metal joints 58, 60 each include metal plates 63, the first and second metal joints 58, 60 may be secured to the first and second spar cap segments 44, 46, respectively, by bonding the metal plates 63 of each of the first and second metal joints 58, 60 to the individual pultrusions 54 of the first and second spar cap segments 44, 46, respectively, e.g. via an adhesive. Alternatively, the first and second metal joints 58, 60 may be secured to the first and second spar cap segments 44, 46, respectively, by infusing the metal plates 63 of each of the first and second metal joints 58, 60 to the pultrusions 54 of the first and second spar cap segments 44, 46, respectively, via a resin material (such as thermoplastic or a thermoset polymer). In still alternative embodiments, as shown in FIG. 7, it should be noted that it is also feasible to secure the metal joints 58, 60 to the first and second rotor blade segments 40, 42 prior to or concurrently with forming the first and second rotor blade segments 40, 42.

Referring still to FIG. 4, as shown at 106, the method 100 includes arranging the first and second metal joints 58, 60 together at an interface 52. As shown at 108, the method 100 includes welding the first and second metal joints 58, 60 together.

In one embodiment, the method 100 may also include forming beveled or stepped ends into the pultrusions 54 of the first and second spar cap segments 44, 46 at the interface 52. In another embodiment, as shown in FIGS. 4-6, the method 100 may include staggering the ends of the pultrusions 54 of the first and second spar cap segments 44, 46 at the interface 52. By staggering locations where the metal plates are bonded to the pultrusions 54, the load transfer from the spar cap segments 44, 46 to the metal joints 58, 60 can be optimized.

In further embodiments, as shown in FIGS. 8 and 9, the method 100 may include forming the first and second rotor blade segments 40, 42 with first and second shear web segments 48, 50, respectively. In such embodiments, the first and second shear web segments 48, 50 may include first and second interlocking ends 74, 76, respectively. As such, the method 100 may also include arranging the first and second interlocking ends 74, 76 together and sliding the interlocking ends together 74, 76 prior to welding the first and second metal joints 58, 60 of the first and second spar cap segments 44, 46. Alternatively, as shown in FIGS. 10-12, various views of another embodiment of connecting the shear web segments 48, 50 at the interface 52 is illustrated. More specifically, FIG. 10 illustrates a top view of the rotor blade 16 at the interface 52; FIG. 11 illustrates a cross-sectional view of FIG. 10 along line 11-11; and FIG. 12 illustrates a cross-sectional view of FIG. 11 along line 12-12. As shown, the shear web segments 48, 50 are joined or bolted together via a joint plate 82 and a plurality of bolts 84.

In several embodiments, the method 100 may further include providing additional features at the interface 52 to secure the rotor blade segments 40, 42 together in addition to welding. For example, the additional features may include placing additional pultrusions or metal components between the first and second metal joints 58, 60, placing a metallic mesh between the first and second metal joints 58, 60, and/or utilizing a joint plate and a plurality of bolts at the interface 52.

Referring now to FIGS. 3 and 13 and 14, a flow diagram of another embodiment of a method 200 for joining rotor blade segments 38 of a rotor blade 16 of a wind turbine 10 is illustrated. As shown at 202, the method 200 includes forming first and second rotor blade segments 40, 42 of a composite material. As shown at 204, the method 200 includes securing first and second metal joints 58, 60 to the first and second rotor blade segments 40, 42, respectively. For example, in one embodiment, the first and second metal joints 58, 60 may be secured to the first and second rotor blade segments 40, 42, respectively, by bonding the first and second metal joints 58, 60 to the first and second rotor blade segments 40, 42 via at least one of an adhesive or a resin material. Further, in particular embodiments, the metal joints 58, 60 may be cast, fabricated, or 3D printed parts.

Referring still to FIG. 13, as shown at 206, the method 200 includes aligning the first and second metal joints 58, 60 together at an interface 52. In particular embodiments, as shown in FIG. 3, the interface 52 may be located away from structural components of the rotor blade 16, e.g. the spar caps or the shear web thereof. For example, as shown in FIG. 14, the first and second metal joints 58, 60 may be aligned together at the interface 52 by aligning corresponding interlocking components 78, 80 of the first and second metal joints 58, 60 together before welding. Thus, when the interlocking components 78, 80 are aligned, as shown at 208, the method 200 includes welding the first and second metal joints 58, 60 together.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for joining rotor blade segments of a rotor blade of a wind turbine, the method comprising:

forming first and second rotor blade segments having first and second spar cap segments, respectively, the first and second spar cap segments being constructed of a composite material;

forming the first and second rotor blade segments with first and second shear web segments, respectively, the first and second shear web segments comprising first and second interlocking ends, respectively;

securing first and second metal joints to the first and second spar cap segments of the first and second rotor blade segments, respectively;

arranging the first and second interlocking ends together;

arranging the first and second metal joints together at an interface;

welding the first and second metal joints together; and welding the first and second interlocking ends concurrently with the first and second metal joints of the first and second spar cap segments.

2. The method of claim 1, wherein the composite material of the first and second spar cap segments comprises one or more pultrusions, the method further comprising forming at least one of beveled ends or stepped ends into the one or more pultrusions of the first and second spar cap segments at the interface.

3. The method of claim 1, further comprising staggering ends of the one or more pultrusions of the first and second spar cap segments at the interface.

4. The method of claim 1, wherein the first and second metal joints each comprises a plurality of metal plates.

5. The method of claim 4, wherein securing the first and second metal joints to the first and second spar cap segments, respectively, further comprises bonding the plurality of metal plates of each of the first and second metal joints to the one or more pultrusions of the first and second spar cap segments, respectively, via an adhesive.

6. The method of claim 4, wherein securing the first and second metal joints to the first and second spar cap segments, respectively, further comprises infusing the plurality of metal plates of each of the first and second metal joints to the one or more pultrusions of the first and second spar cap segments, respectively, via a resin material.

7. The method of claim 4, further comprising:
forming a sloped area into a side of each of the plurality of metal plates; and, placing a filler material within each of the sloped areas of the plurality of metal plates.

8. The method of claim 1, further comprising providing additional features at the interface to secure the first and second rotor blade segments together in addition to welding, the additional features comprising at least one of placing additional pultrusions or metal components between the first and second metal joints, placing a metallic mesh between the first and second metal joints, or utilizing a joint plate and a plurality of bolts at the interface.

9. A method for joining rotor blade segments of a rotor blade of a wind turbine, the method comprising: forming first and second rotor blade segments of a composite material; forming the first and second rotor blade segments with first and second shear web segments, respectively, the first and second shear web segments comprising first and second interlocking ends, respectively; securing first and second metal joints to the first and second rotor blade segments, respectively; arranging the first and second interlocking ends together; aligning the first and second metal joints together at an interface; and, welding the first and second metal joints together; and welding the first and second interlocking ends concurrently with the first and second metal joints of the first and second rotor blade segments.

10. The method of claim 9, wherein securing the first and second metal joints to the first and second rotor blade segments, respectively, further comprises bonding the first and second metal joints to the first and second rotor blade segments via at least one of an adhesive or a resin material.

11. The method of claim 9, wherein aligning the first and second metal joints together at the interface further comprises aligning corresponding interlocking components of the first and second metal joints together before welding.

12. The method of claim 9, wherein the interface is located away from at least one of a spar cap or a shear web of the rotor blade.

* * * * *